United States Patent
Lin et al.

(10) Patent No.: US 11,863,520 B2
(45) Date of Patent: Jan. 2, 2024

(54) DATA ACCESS METHODS AND SYSTEMS

(71) Applicant: Alibaba Group Holding Limited, Grand Cayman (KY)

(72) Inventors: Muhui Lin, Hangzhou (CN); Xin Wu, Hangzhou (CN); Shunan Li, Hangzhou (CN); Zhixiong Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/763,609

(22) PCT Filed: Sep. 21, 2020

(86) PCT No.: PCT/CN2020/116466
§ 371 (c)(1),
(2) Date: Mar. 24, 2022

(87) PCT Pub. No.: WO2021/057650
PCT Pub. Date: Apr. 1, 2021

(65) Prior Publication Data
US 2022/0337548 A1    Oct. 20, 2022

(30) Foreign Application Priority Data
Sep. 25, 2019    (CN) .......................... 201910912110.8

(51) Int. Cl.
*H04L 61/50*    (2022.01)
*H04L 67/1097*    (2022.01)

(52) U.S. Cl.
CPC .......... *H04L 61/50* (2022.05); *H04L 67/1097* (2013.01)

(58) Field of Classification Search
CPC .......................... H04L 61/50; H04L 67/1097
See application file for complete search history.

(56) References Cited

U.S. PATENT DOCUMENTS

| 2014/0269290 A1 | 9/2014 | Cors et al. |
| 2014/0282889 A1 | 9/2014 | Ishaya et al. |

(Continued)

FOREIGN PATENT DOCUMENTS

| CN | 1761209 A | 4/2006 |
| CN | 101056178 A | 10/2007 |

(Continued)

*Primary Examiner* — Viet D Vu

(57) ABSTRACT

Embodiments of this application relate to the data access field, including data access methods systems that enable efficient and effective data access. In one embodiment, a method includes: assigning, by an RDMA control service based on user information and a corresponding connection relationship between a switch and a first instance defined by a user, an address segment to the first instance; building, by the RDMA control service, an access control list based on the address segment assigned to the first instance, where the access control list is used for controlling access between different first instances defined by the user; and sending, by the RDMA control service, the access control list to a switch control service, such that the switch control service configures the access control list for the switch. In one embodiment, access between different instances defined by a same user can be effectively controlled, thereby effectively resolving an issue of access isolation for different users accessing an RDMA network node.

18 Claims, 8 Drawing Sheets

(56) References Cited

U.S. PATENT DOCUMENTS

| | | | | |
|---|---|---|---|---|
| 2015/0067086 A1* | 3/2015 | Adriaens | ............... | H04L 47/70 |
| | | | | 709/212 |
| 2016/0072816 A1 | 3/2016 | Makhervaks et al. | | |
| 2016/0337272 A1* | 11/2016 | Berman | ............... | H04L 49/70 |
| 2017/0046807 A1 | 2/2017 | Ford | | |
| 2017/0147507 A1* | 5/2017 | Horii | ............... | G06F 13/28 |
| 2019/0132322 A1* | 5/2019 | Song | ............... | H04L 63/101 |

FOREIGN PATENT DOCUMENTS

| | | |
|---|---|---|
| CN | 102932405 A | 2/2013 |
| CN | 105323282 A | 2/2016 |
| CN | 105376303 A | 3/2016 |
| CN | 105393239 A | 3/2016 |
| CN | 107079003 A | 8/2017 |
| CN | 109656467 A | 4/2019 |
| WO | 2019055100 A1 | 3/2019 |

\* cited by examiner

DATA ACCESS METHODS AND SYSTEMS

This application claims priority to Chinese Patent Application No. 201910912110.8, filed with the Chinese Patent Office on Sep. 25, 2019 and entitled "DATA ACCESS METHOD, APPARATUS, AND SYSTEM, ELECTRONIC DEVICE, AND COMPUTER READABLE MEDIUM", which is incorporated herein by reference in its entirety.

TECHNICAL FIELD

Embodiments of this application relate to the data access field, and in particular, to a data access via various methods, apparatuses, systems, electronic devices, computer readable mediums, and so on.

BACKGROUND

Traditionally, RoCE (RDMA over Converged Ethernet, where RDMA is Remote Direct Memory Access) via a DCB (Data Center Bridge, data center bridge) network is based on an enhanced Ethernet protocol, which guarantees reliable data transmission at a link layer through priority and flow control.

An RDMA packet based on RoCEv2 (RoCE version 2) is embedded in a UDP (User Datagram Protocol, user datagram protocol) packet, and UDP relies on Transmission Control Protocol/Internet Protocol (TCP/IP) for routing. As the TCP/IP protocol serves the mass public, a RoCE-based switching infrastructure is likely to be used by different customers. Attempts at RoCE-based RDMA communication functions on public cloud instances, can give rise to issues associated with access isolation for different users accessing RoCE-based RDMA network nodes. Resolving issues associated with access isolation for different users accessing an RDMA network node is traditionally problematic.

SUMMARY

The presented data access approaches (e.g., a data access method, apparatus, system, electronic device, computer readable mediums, etc.) enable efficient and effective access isolation for different users accessing an RDMA network node.

According to a first aspect of one embodiment, a data access method is provided. The method includes: assigning, by an RDMA control service, an address segment to the first instance, where the assigning is based on user information and a corresponding connection relationship between a switch and a first instance defined by a user; building, by the RDMA control service, an access control list based on the address segment assigned to the first instance, where the access control list is used for controlling access between different first instances defined by the user; and sending, by the RDMA control service, the access control list to a switch control service, such that the switch control service configures the access control list for the switch.

According to a second aspect of one embodiment, a data access apparatus is provided. The data access apparatus includes: an assignment module configured to assign, based on user information and a corresponding connection relationship between a switch and a first instance defined by a user, an address segment to the first instance; a building module configured to build an access control list based on the address segment assigned to the first instance, where the access control list is used for controlling access between different first instances defined by the user; and a first sending module configured to send the access control list to a switch control service, such that the switch control service configures the access control list for the switch.

According to a third aspect of one embodiment, a data access system is provided. The data access system includes: an RDMA control service configured to assign, based on user information and a corresponding connection relationship between a switch and a first instance defined by a user, an address segment to the first instance, build an access control list based on the address segment assigned to the first instance, where the access control list is used for controlling access between different first instances defined by the user, and send the access control list to a switch control service; and the switch control service configures the access control list for the switch based on the received access control list.

According to a fourth aspect of one embodiment, an electronic device is provided and includes: one or more processors; and a computer readable medium that stores one or more programs; where when the one or more programs are executed by the one or more processors, the one or more processors are caused to implement the data access method described in the first aspect of the embodiments.

According to a fifth aspect of one embodiment, a computer readable medium storing a computer program is provided, where when the computer program is executed by a processor, the data access method described in the first aspect of the embodiments is implemented.

According to the technical solution provided in the embodiments, an RDMA control service assigns, based on user information and a corresponding connection relationship between a switch and a first instance defined by a user, an address segment to the first instance; builds an access control list based on the address segment assigned to the first instance, where the access control list is used for controlling access between different first instances defined by the user; and sends the access control list to a switch control service, such that the switch control service configures the access control list for the switch. Compared with other existing methods, configuring for the switch the access control list that is built can effectively control access between different instances defined by the same user, thus effectively resolving the issue of access isolation for different users accessing an RDMA network node.

BRIEF DESCRIPTION OF DRAWINGS

Other features, purposes, and advantages will become clearer by reading the following detailed description of the non-limitative embodiments with reference to the accompanying drawings.

DESCRIPTION OF EMBODIMENTS

The following further describes this application in detail with reference to the accompanying drawings and embodiments. It can be understood that the embodiments described herein are merely configured for explaining the relevant invention and not for limiting the invention. In addition, it should be noted that, for ease of description, parts related to the relevant invention are shown in the accompanying drawings.

It should be noted that, without conflicts, the embodiments and features in the embodiments in this application can be mutually combined. The following describes this application in detail with reference to the accompanying drawings and embodiments.

Figure 1A:
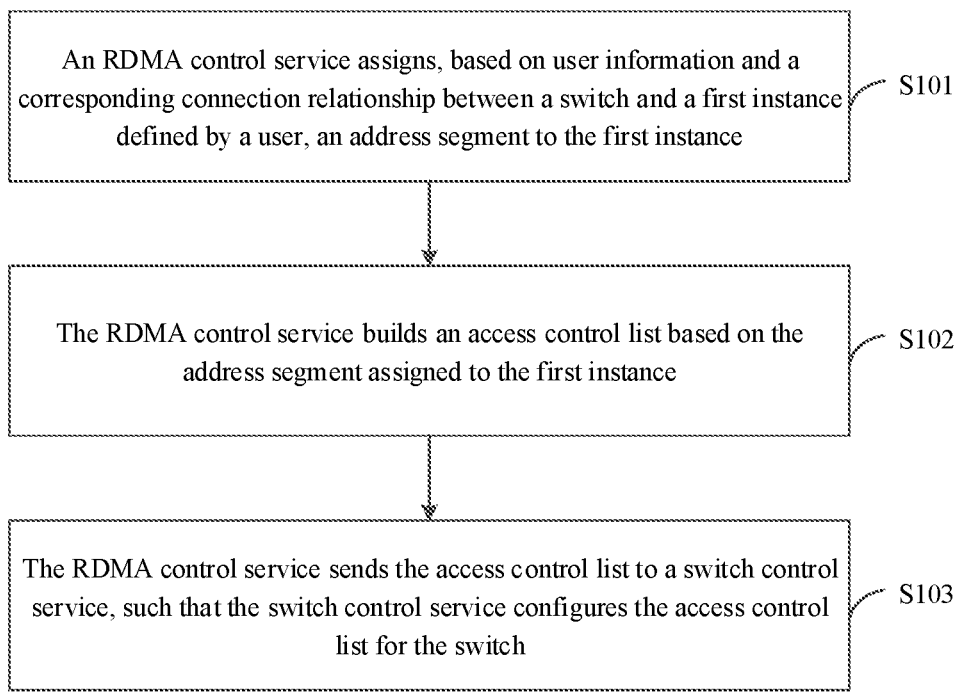
FIG. 1A is a flowchart of steps of a data access method in accordance with one embodiment.

FIG. 1A is a flowchart of steps of a data access method in accordance with one embodiment.

In step S101, an RDMA control service assigns, based on user information and a corresponding connection relationship between a switch and a first instance defined by a user, an address segment to the first instance.

In one embodiment, the RDMA control service can be understood as a RoCE-based RDMA communication function service for controlling instances of public clouds. Processes, applications, virtual machines, servers, and so on may be used to implement the RDMA control service. The user information may be identification information of the user, for example, an account of the user or a nickname of the user. The first instance can be understood as a core part of an ECS (Elastic Compute Service, elastic compute service) product, which is a server with a corresponding CPU, memory, system disk, and running operating system configuration. The first instance is a most basic resource of ECS. In one exemplary implementation, only based on the first instance can other resources such as networks, storage, and snapshots be used. The switch may be a RoCE-based switch. The corresponding connection relationship between the switch and the first instance defined by the user can be understood as a corresponding connection relationship between a RoCE-based RDMA network port of the first instance and a port of a RoCE-based switch defined by the user. The address segment can be understood as a continuous segment of addresses. The RoCE may be a DCB (Data Center Bridge, data center bridge) network.

In one embodiment, before the RDMA control service assigns an address segment for the first instance, the method further includes: receiving, by the RDMA control service, a multicast packet carrying information about a network port of a second instance that is sent by the second instance through the network port; sending, by the RDMA control service, a query request to a machine deployment control service based on the information about the network port that is carried in the multicast packet, to query for deployment information of the second instance; and receiving, by the RDMA control service, the deployment information returned by the machine deployment control service based on the query request, and determining a corresponding connection relationship between the second instance and the switch based on the deployment information. The information about the network port may be port numbers of two ports of the RDMA network port of the second instance, or may be identification information of the RDMA network port of the second instance. The multicast packet may be a multicast packet based on LLDP (Link Layer Discovery Protocol, link layer discovery protocol). The machine deployment control service can be understood as a service for controlling instance deployment. Processes, applications, virtual machines, servers, and so on may be used to implement the machine deployment control service. The specific meaning of the second instance is similar to the specific meaning of the first instance, and is therefore not elaborated herein.

In one embodiment, the method further includes: storing, by the RDMA control service, the corresponding connection relationship between the second instance and the switch into a relationship table. In this way, by storing the corresponding connection relationship between the second instance and the switch in the relationship table, it is convenient to subsequently build an access control list for controlling access between different first instances defined by a same user.

In one exemplary implementation, the machine deployment control service controls an adapter of the second instance through a management channel, and downloads a deployment image file from a designated deployment image storage service to the second instance. Specifically, the deployed image file can reach the second instance through the management channel or a path from the deployment image storage service to an Ethernet switch. The machine deployment control service then controls, through the management channel, the adapter of the second instance to start the deployment image file that has reached the second instance, causing the second instance to perform related deployment. Specifically, by controlling the two ports of the RDMA network port, the second instance sends LLDP multicast packets carrying information about the ports respectively to a DCB switch, such that the LLDP multicast packets are sent to the RDMA control service. After receiving the LLDP multicast packets, the RDMA control service sends a query request to the machine deployment control service, to query for deployment information of the second instance. The machine deployment control service returns the deployment information of the second instance to the RDMA control service. The RDMA control service then may establish the following correspondence based on the deployment information of the second instance: a corresponding connection relationship between the RDMA network port of the second instance and the DCB switch. In addition, the RDMA control service stores the corresponding connection relationship into a corresponding relationship table. The deployment image storage service can be understood as a service for storing deployment image files. Processes, applications, virtual machines, servers, and so on may be used to implement the deployment image storage service.

In one embodiment, the method further includes: receiving, by the RDMA control service, an address assignment request sent by an instance control service based on the first instance; and querying, by the RDMA control service, for a corresponding connection relationship between the first instance and the switch based on the address assignment request. In this way, by querying for the corresponding connection relationship between the first instance and the switch based on the received address assignment request, it is convenient to subsequently build an access control list for controlling access between different first instances defined by a same user. The instance control service can be understood as a service for controlling first instances defined by a user. Processes, applications, virtual machines, servers, and so on may be used to implement the instance control service.

In one exemplary implementation, when the RDMA control service queries for the corresponding connection relationship between the first instance and the switch based on the address assignment request, the RDMA control service queries, based on identification information of the first instance carried in the address assignment request, the relationship table storing the corresponding connection relationship between the second instance and the switch, to acquire the corresponding connection relationship between the first instance and the switch.

In one embodiment, when the RDMA control service assigns, based on user information and a corresponding connection relationship between a switch and a first instance defined by the user, an address segment to the first instance, the RDMA control service invokes, based on the user information carried in the address assignment request and the corresponding connection relationship between the first instance and the switch that is acquired through quay, an address assignment service to assign the address segment to the first instance. In this way, the address segment is assigned to the first instance by invoking the address assignment service, thereby effectively resolving an issue of address assignment for different users accessing an RDMA network node. The address assignment service can be understood as a service for assigning addresses. Processes, applications, virtual machines, servers, and so on may be used to implement the address assignment service.

In step S102, the RDMA control service builds an access control list based on the address segment assigned to the first instance.

In one embodiment, the access control list is used for controlling access between different first instances defined by the user.

In one exemplary implementation, in building the access control list, the access control list is built based on addresses of different first instances defined by the user and included in the assigned address segment, to allow access between the different first instances defined by the same user. Specifically, access between different first instances defined by the same user is allowed, and access between first instances defined by different users is forbidden.

In one exemplary implementation, to create a first instance with a RoCE-based RDMA communication function, the user may create a data structure of an instance cluster using a web console or an external service API (application programming interface, application programming interface) of a product. The instance control service returns identification information of the instance cluster. The user further uses the identification information to select a specification from a corresponding elastic compute specification family, and invokes the API to create a specific instance according to the specification selected from the elastic compute specification family. The instance control service requests, based on the created specific instance, the RDMA control service to assign an address for the created specific instance, where parameters carried in the quest may include identification information of the instance. The RDMA control service queries the corresponding connection relationship between the network port of the instance and the switch based on the identification information of the instance carried in the request, and invokes a DHCP (Dynamic Host Configuration Protocol, dynamic host configuration protocol) service to assign an address to the network port of the instance. Generally, for reliability, the two ports corresponding to the network port of the instance may be bound, and therefore one or two addresses may be assigned depending on an actual situation. The DHCP service can be understood as an IP address assignment service. In addition, the RDMA control service has already stored in the deployment phase a corresponding connection relationship between RDMA network ports of the instances and DCB switches. Therefore, the RDMA control service may quay, based on the identification information of the instance carried in the request, a corresponding connection relationship between a DCB switch and an RDMA network port of an instance defined by a user, and create, based on the identification information of the user carried in the address assignment request and the corresponding connection relationship between the DCB switch and the RDMA network port of the instance defined by the user, an access control list for the instance defined by the user. The access control list acts on DCB switches corresponding to RDMA network ports of instances defined by the user and is configured on DCB switches through the switch control service, allowing the RDMA network ports of the instances defined by the same user to communicate with each other.

In step S103, the RDMA control service sends the access control list to a switch control service, such that the switch control service configures the access control list for the switch.

In one embodiment, the switch control service can be understood as a service for controlling RoCE-based switches. Processes, applications, virtual machines, servers, and so on may be used to implement the switch control service. The switch may be a DCB (Data Center Bridge, data center bridge) switch.

In one embodiment, after the RDMA control service sends the access control list to the switch control service, the method further includes: returning, by the RDMA control service to the instance control service, the address segment assigned by the address assignment service for the first instance, such that the instance control service starts the first instance to acquire from an image service an image file matching a specification of the first instance, and configures, based on the image file, the address segment assigned by the address assignment service for the first instance. The image service can be understood as a service for storing image files. Processes, applications, virtual machines, servers, and so on may be used to implement the image service. In this way, the address segment assigned by the address assignment service for the first instance is returned to the instance control service, such that the instance control service can start the address segment configured and assigned by the first instance.

In one exemplary implementation, after the switch control service has configured the access control list for the DCB switch, the RDMA control service returns the address assigned by the address assignment service for the first instance to the instance control service. The instance control service starts the instance and designates the instance to acquire an image file for the specification of the instance from a corresponding image service. After the image file is transferred to the corresponding instance and is executed, the instance starts to configure the address requested by the instance control service for the instance on the RDMA network port of the instance. The user starts to use the instance that has a RoCE-based RDMA communication function.

In one embodiment, the method further includes: receiving, by the RDMA control service, a second instance release request sent by the instance control service based on a first instance release request sent by a user; reclaiming, by the RDMA control service based on the second instance release request, an address of a to-be-released instance corresponding to instance identification information carried in the second instance release request, and configuring, through the switch control service, the switch connected to the to-be-released instance such that a network port of the switch connected to the to-be-released instance is disconnected from other network ports; and returning, by the RDMA control service to the instance control service, a release result of the to-be-released instance requested by the second instance release request, such that the instance control service returns the to-be-released instance to an inventory and returns a release success message to the user. In this way, a to-be-released instance requested by the user can be released through the received second instance release request.

In one exemplary implementation, the user sends an instance release request to the instance control service through an API or a console. The instance control service receives the request and requests the RDMA control service to release the instance. The RDMA control service reclaims the address of the RDMA network port of the instance, configures the DCB switch through the switch control service, configures the DCB switch corresponding to the RDMA network port of the instance to be disconnected from other network ports, and return an instance release result to the instance control service. The instance control service continues to release other resources related to the instance, returns the instance to an inventory, and returns instance release success information to the user.

Figure 1B:
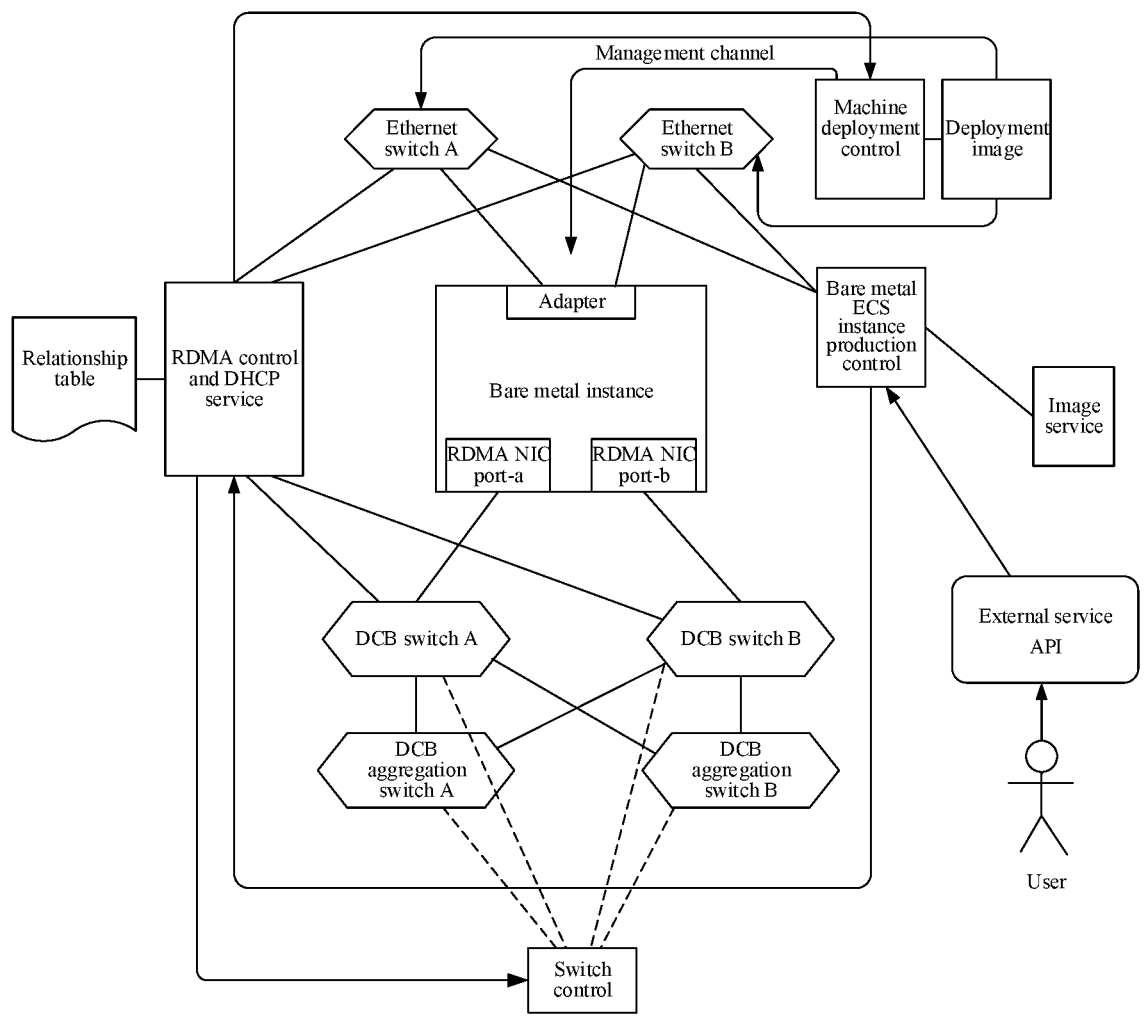
FIG. 1B is a schematic structural diagram of a data access system based on a bare metal instance in accordance with one embodiment.

In one exemplary implementation, when an instance created by a user through an API or a console is a bare metal instance, a data access procedure can be described in detail with reference to the data access system shown in FIG. 1B. A structure of the data access system shown in FIG. 1B is: An adapter of the bare metal instance can realize interconnection between the bare metal instance and elastic computing control, with two network ports connected to an Ethernet switch to form dual upstream connections and a management channel connected to a machine deployment control service. In addition, the bare metal instance further has two enhanced Ethernet-based RDMA network ports, which are connected to a DCB switch to form dual upstream connections, and the DCB switch is further connected to a DCB aggregation switch with dual upstream connections to avoid a single point of failure. Furthermore, the data access system has a highly available machine deployment control service, which is connected to the bare metal instance and an RDMA control service through the management channel. The RDMA control service also has a highly available configuration to avoid system unavailability caused by a single server failure. The RDMA control service is connected to the machine deployment control service and a switch control service to control a configuration of the DCB switch. Moreover, the data access system also includes an elastic bare metal ECS (Elastic Compute Service, elastic compute service) production control service, which provides the public with elastic compute services through external service APIs or web consoles. Next, the data access procedure is introduced in detail with reference to the data access system shown in FIG. 1B. Specifically, the data access procedure includes a deployment phase, a user usage phase, and a user destruction phase.

The deployment phase is as follows: The machine deployment control service controls an adapter of the bare metal instance through the management channel, and downloads a deployment image file from a designated deployment image storage service to the bare metal instance. Specifically, the deployment image file can reach the bare metal instance through the management channel or a path from the deployment image storage service to an Ethernet switch. The machine deployment control service then controls, through the management channel, the adapter of the bare metal instance to start the deployment image file that has reached the bare metal instance, causing the bare metal instance to perform related deployment. Specifically, by controlling the two ports (port-a and port-b) of the RDMA network port, the bare metal instance sends LLDP multicast packets carrying information about the ports respectively to a DCB switch, such that the LLDP multicast packets are sent to the RDMA control service. After receiving the LLDP multicast packets, the RDMA control service sends a query request to the machine deployment control service, to query for deployment information of the bare metal instance. The machine deployment control service returns the deployment information of the bare metal instance to the RDMA control service. The RDMA control service then may establish the following corresponding relationship based on the deployment information of the bare metal instance: a corresponding connection relationship between the RDMA network port of the bare metal instance and the DCB switch. In addition, the RDMA control service stores the corresponding connection relationship into a corresponding relationship table.

In one embodiment, the user usage stage is as follows: To create a bare metal instance with a RoCE-based RDMA communication function, the user may create a data structure of a bare metal instance cluster through a web console or an external service API (application programming interface, application programming interface) of a product. The bare metal ECS instance control service returns identification information of the bare metal instance cluster. The user further uses the identification information to select a specification from a corresponding elastic compute specification family, and invokes the API to create a specific bare metal instance according to the specification selected from the elastic compute specification family. The bare metal ECS instance control service requests, based on the created specific bare metal instance, the RDMA control service to assign an address for the created specific bare metal instance, where parameters carried in the quest may include identification information of the bare metal instance and the identification information of the user. The RDMA control service queries the corresponding connection relationship between the network port of the bare metal instance and the DCB switch based on the identification information of the bare metal instance carried in the request, and invokes a DHCP (Dynamic Host Configuration Protocol, dynamic host configuration protocol) service to assign an address to the network port of the bare metal instance. Generally, for reliability, the two ports corresponding to the network port of the bare metal instance may be bound, and therefore one or two addresses may be assigned depending on an actual situation. In addition, the RDMA control service has already stored the corresponding connection relationship between the RDMA network port of the bare metal instance and the DCB switch in the deployment phase. Therefore, the RDMA control service may query, based on identification information of a bare metal instance defined by a user, a corresponding connection relationship between a DCB switch and an RDMA network port of the bare metal instance defined by a user, and create, based on the identification information of the user carried in the address assignment request and the corresponding connection relationship between the DCB switch and the RDMA network port of the bare metal instance defined by the user, an access control list for the bare metal instance defined by the user. The access control list acts on DCB switches corresponding to RDMA network ports of bare metal instances defined by the user and is configured on DCB switches through the switch control service, allowing the RDMA network ports of the bare metal instances defined by the same user to communicate with each other. After the switch control service has configured the access control list for the DCB switch, the RDMA control service returns the address assigned by the address assignment service for the RDMA network port of the bare metal instance to the bare metal ECS instance control service. The bare metal ECS instance control service starts the bare metal instance and assigns the bare metal instance to a corresponding image service to acquire an image file for the specification of the bare metal instance. After the image file is transferred to the corresponding bare metal instance and is executed, the bare metal instance starts to configure an IP address requested by the bare metal ECS instance control service for the bare metal instance on the RDMA network port of the bare metal instance. The user starts to use the bare metal instance that has a RoCE-based RDMA communication function.

The user destruction phase is as follows: The user sends a bare metal instance release request to the ECS instance control service through an API or a console. The ECS instance control service receives the request and requests the RDMA control service to release the bare metal instance. The RDMA control service reclaims the address of the RDMA network port of the bare metal instance, configures the DCB switch through the switch control service such that the DCB switch corresponding to the RDMA network port of the bare metal instance is disconnected from other network ports, and return a bare metal instance release result to the ECS instance control service. The ECS instance control service continues to release other resources related to the bare metal instance, returns the bare metal instance to an inventory, and returns bare metal instance release success information to the user. In one exemplary implementation, the bare metal instance can be understood as a server with only one set of corresponding configurations: CPU, memory, system disk, and running operating system.

According to a data access method, an RDMA control service assigns, based on user information and a corresponding connection relationship between a switch and a first instance defined by a user, an address segment to the first instance; builds an access control list based on the address segment assigned to the first instance, where the access control list is used for controlling access between different first instances defined by the user; and sends the access control list to a switch control service, such that the switch control service configures the access control list for the switch. Compared with other existing traditional methods, configuring for the switch the access control list that is built can effectively control access between different instances defined by the same user, thus effectively resolving the issue of access isolation for different users accessing an RDMA network node.

It is appreciated data access methods described herein can be executed by any suitable device with a data processing capability, including but not limited to: a camera, a terminal, a mobile terminal, a PC machine, a server, an in-vehicle device, an entertainment device, an advertising device, a personal digital assistant (PDA), a tablet computer, a notebook computer, a handheld game console, smart glasses, a smart watch, a wearable device, a virtual display device or a display enhanced device (for example, Google Glass, Oculus Riff Hololens, or Gear VR), and the like.

Figure 2A:
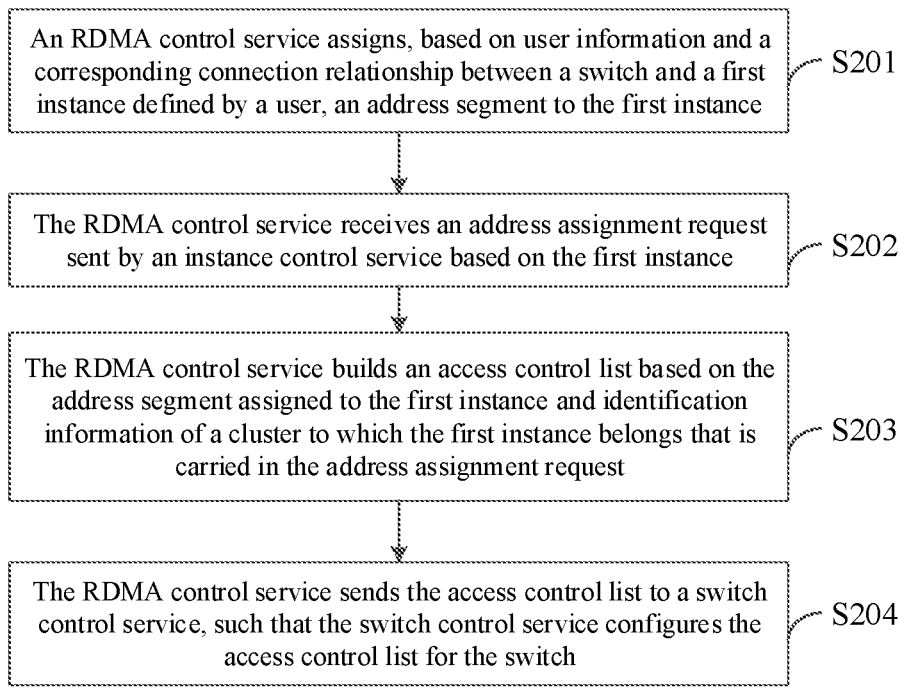
FIG. 2A is a flowchart of steps of a data access method in accordance with one embodiment.

FIG. 2A is a flowchart of steps of a data access method in accordance with one embodiment.

In step S201, an RDMA control service assigns, based on user information and a corresponding connection relationship between a switch and a first instance defined by a user, an address segment to the first instance.

This step S201 is similar to the foregoing step S101, and is not elaborated herein.

In step S202, the RDMA control service receives an address assignment request sent by an instance control service based on the first instance.

In one embodiment, information carried in the address assignment request includes at least one of the following: identification information of the user, identification information of an instance cluster defined by the user, and identification information of an instance.

In step S203, the RDMA control service builds an access control list based on the address segment assigned to the first instance and identification information of a cluster to which the first instance belongs that is carried in the address assignment request.

In one embodiment, the access control list is used for controlling access between different first instances in a same cluster.

In one exemplary implementation, in building the access control list, the RDMA control service performs, based on the identification information of the cluster to which the first instance belongs that is carried in the address assignment request, a filtering operation on addresses of different first instances defined by the user and included in the assigned address segment, to acquire addresses of different first instances belonging to a same cluster; and builds the access control list based on the addresses of the different first instances belonging to the same cluster, to allow access between the different first instances defined by the same user and belonging to the same cluster. Specifically, access between different first instances defined by the same user and belonging to the same cluster is allowed, access between first instances defined by different users is forbidden, and access between different first instances defined by the same user and belonging to different clusters is forbidden.

In step S204, the RDMA control service sends the access control list to a switch control service, such that the switch control service configures the access control list for the switch.

This step S204 is similar to the foregoing step S103, and is not elaborated herein.

Figure 2B:
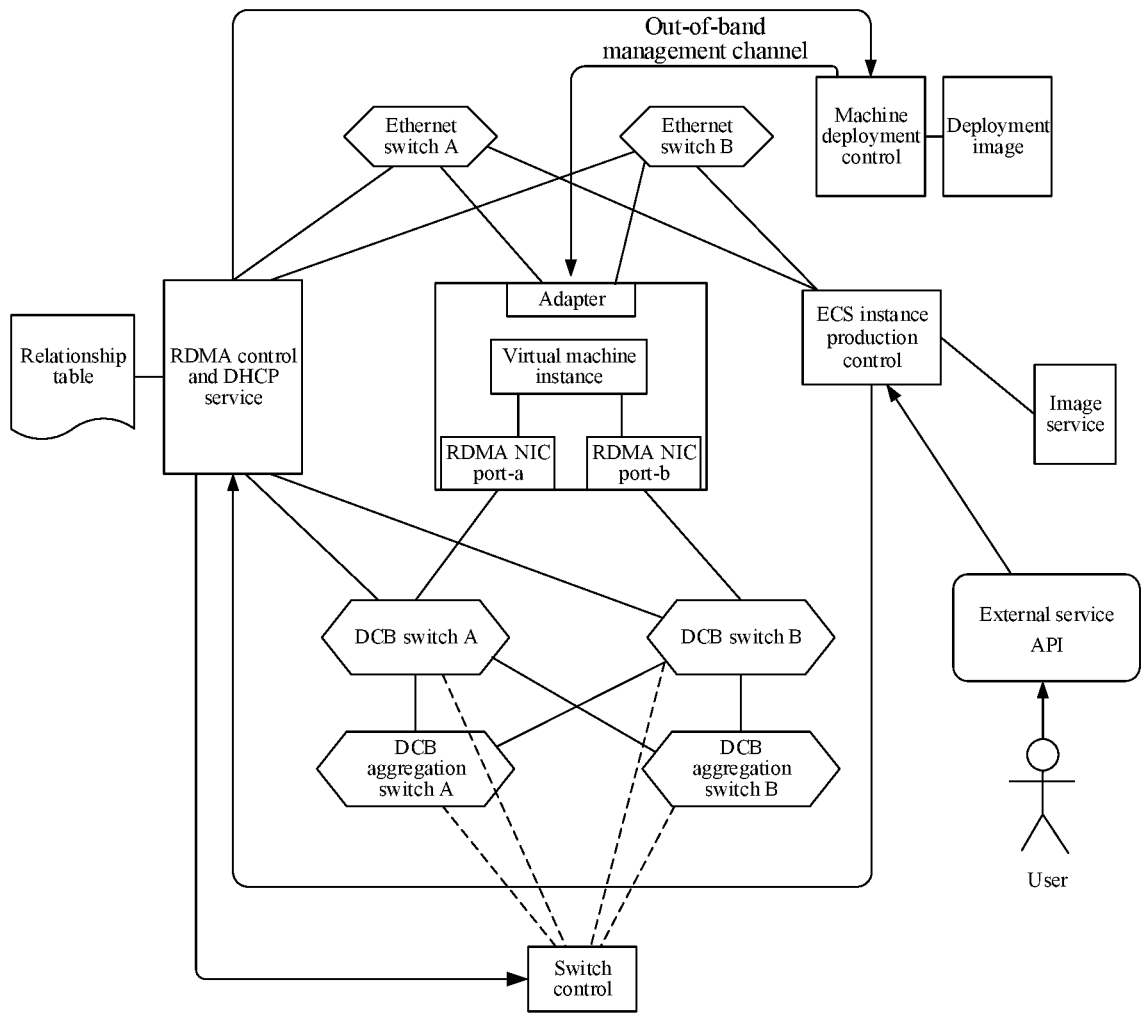
FIG. 2B is a schematic structural diagram of a data access system based on a virtual machine instance in accordance with one embodiment.

In one exemplary implementation, when an instance created by a user through an API or a console is a virtual machine instance, a data access procedure can be described in detail with reference to the data access system shown in FIG. 2B. The structure of the data access system shown in FIG. 2B is similar to the structure of the data access system shown in FIG. 1B, and is not elaborated herein. The data access procedure with reference to the data access system shown in FIG. 2B is roughly similar to that with reference to the data access system shown in FIG. 1B, and therefore is not further elaborated herein. A difference between the data access procedure for the virtual machine instance and the data access procedure for the bare metal instance lies in that the virtual machine instance runs a virtual machine monitor (virtual machine monitor or hypervisor). In addition, in creating a virtual machine instance, an enhanced Ethernet-based RDMA network port of the virtual machine instance is directly connected to a virtual machine of the virtual machine instance, and the enhanced Ethernet-based RDMA network port of the virtual machine instance is configured on the virtual machine of the virtual machine instance. Direct connection methods include but are not limited to PF (physical function) direct connection, VF (virtual function) direct connection using SRIOV technology, or other analog solutions. The virtual machine instance can be understood as a core part of an ECS (Elastic Compute Service, elastic compute service) product, which is a server configured with a corresponding virtual CPU and virtual memory.

According to the data access method provided in one embodiment, an RDMA control service assigns, based on user information and a corresponding connection relationship between a switch and a first instance defined by a user, an address segment to the first instance; receive an address assignment request sent by the instance control service based on the first instance, and builds an access control list based on the address segment assigned to the first instance and identification information of a cluster to which the first instance defined by the user belongs that is carried in the address assignment request, where the access control list is used for controlling access between different first instances belonging to the same cluster; and sends the access control list to a switch control service, such that the switch control service configures the access control list for the switch. Compared with other existing traditional methods, the access control list that is built can effectively control access between the different instances belonging to the same cluster, thus effectively resolving the issue of isolation of access to an RDMA network node by different instance clusters defined by the same user.

In one embodiment, a data access method can be executed by any suitable device with a data processing capability, including but not limited to: a camera, a terminal, a mobile terminal, a PC machine, a server, an in-vehicle device, an entertainment device, an advertising device, a personal digital assistant (PDA), a tablet computer, a notebook computer, a handheld game console, smart glasses, a smart watch, a wearable device, a virtual display device or a display enhanced device (for example, Google Glass, Oculus Riff Hololens, or Gear VR), and the like.

Figure 3A:
FIG. 3A is a schematic structural diagram of a data access system in accordance with one embodiment.

FIG. 3A is a schematic structural diagram of a data access system in accordance with one embodiment.

In one embodiment, the data access system provided includes: an RDMA control service 301 configured to assign, based on user information and a corresponding connection relationship between a switch and a first instance defined by a user, an address segment to the first instance, build an access control list based on the address segment assigned to the first instance, where the access control list is used for controlling access between different first instances defined by the user, and send the access control list to a switch control service; and the switch control service that configures the access control list for the switch based on the received access control list.

In one embodiment, the first instance includes an adapter, and the adapter integrates a network port. The network port is an enhanced Ethernet-based RDMA network port. In this way, by integrating an enhanced Ethernet-based RDMA network port of an instance into an adapter of the instance, it is possible to save two Ethernet switches connected to the instance.

Figure 3B:
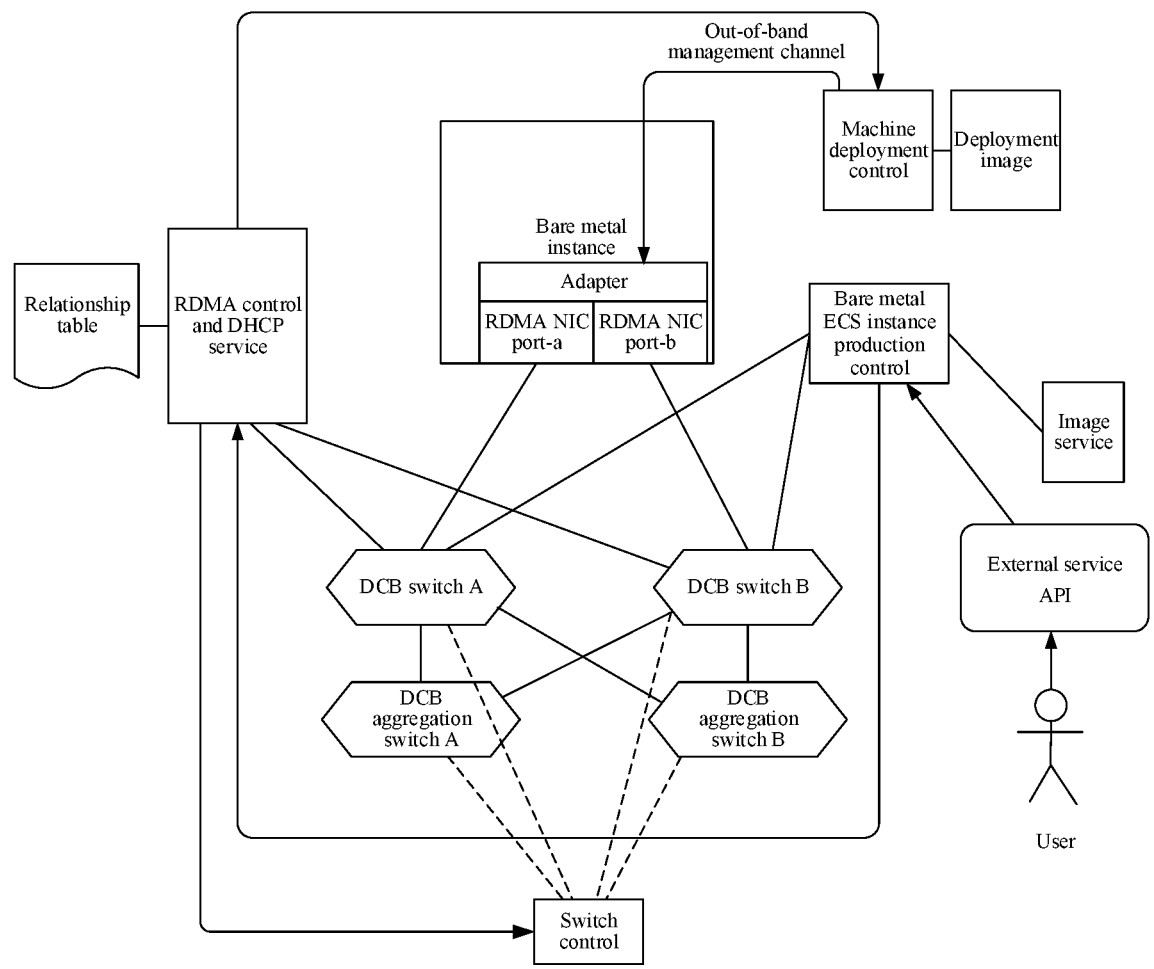
FIG. 3B is a schematic structural diagram of a data access system with a structure of an adapter modified in accordance with one embodiment.

In one exemplary implementation, when the instance created by the user through the API or the console is a bare metal instance, as shown in FIG. 3B, an adapter of the bare metal instance integrates an enhanced Ethernet-based RDMA network port of the bare metal instance. In this way, two uplink Ethernet switches can be saved, and the enhanced Ethernet-based RDMA network port of the bare metal instance is not only used as a transmission channel of enhanced Ethernet-based RDMA, but also used as a transmission channel of ordinary Ethernet.

Figure 3C:
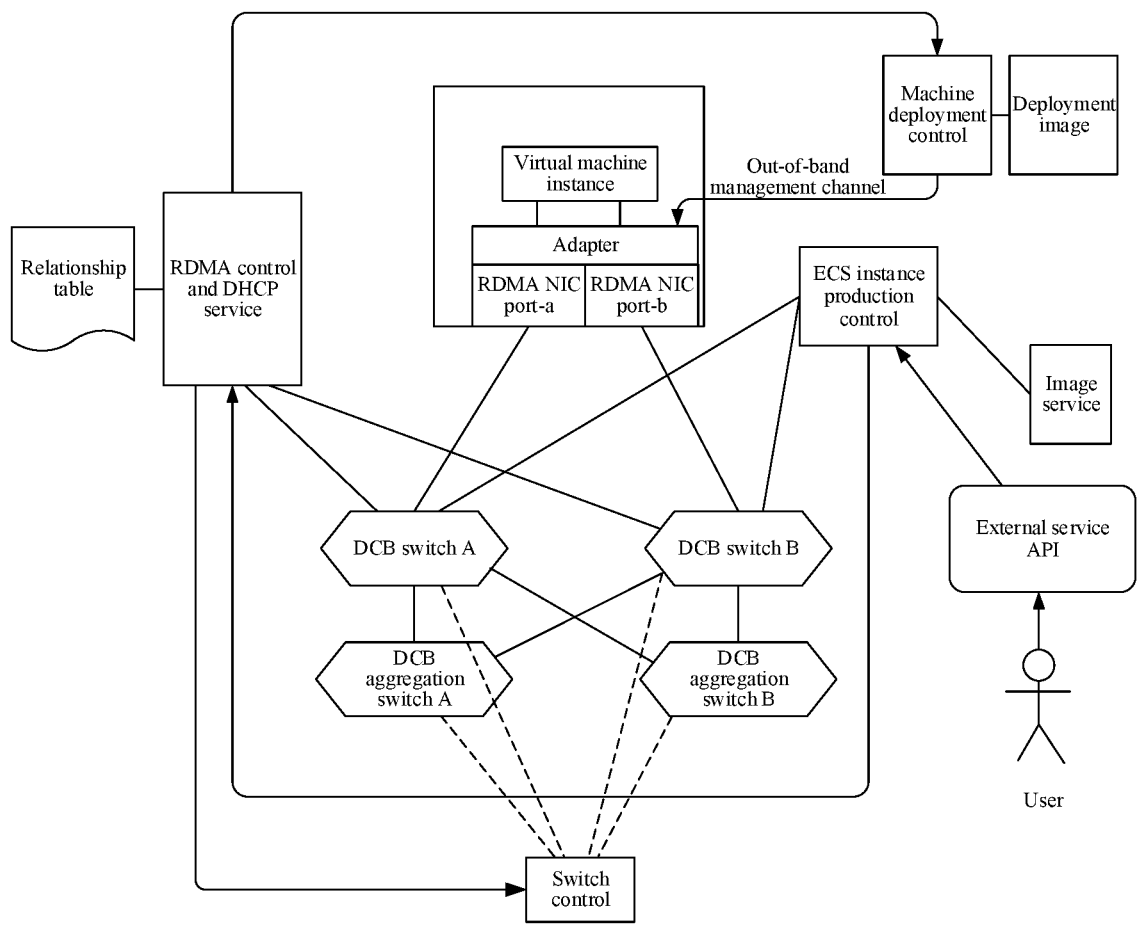
FIG. 3C is a schematic structural diagram of a data access system with a structure of an adapter modified in accordance with one embodiment.

In one exemplary implementation, when the instance created by the user through the API or the console is a virtual machine instance, as shown in FIG. 3C, an adapter of the virtual machine instance integrates an enhanced Ethernet-based RDMA network port of the virtual machine instance, and the RDMA network port integrated into the adapter is directly connected to a virtual machine of the virtual machine instance. In this way, two uplink Ethernet switches can be saved, and the enhanced Ethernet-based RDMA network port of the virtual machine instance is not only used as a transmission channel of enhanced Ethernet-based RDMA, but also used as a transmission channel of ordinary Ethernet.

In one embodiment, the data access system can be used to implement the corresponding data access methods in the foregoing method embodiments, and has the same beneficial effects as the corresponding method embodiments, which are not repeated herein.

Figure 4:
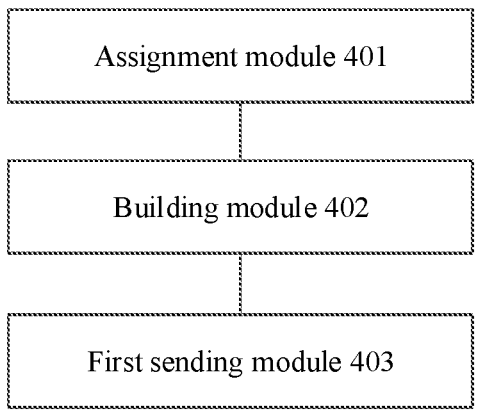
FIG. 4 is a schematic structural diagram of a data access apparatus in accordance with one embodiment.

FIG. 4 is a schematic structural diagram of a data access apparatus in accordance with one embodiment.

In one embodiment, the data access apparatus includes: an assignment module 401 configured to assign, based on user information and a corresponding connection relationship between a switch and a first instance defined by a user, an address segment to the first instance; a building module 402 configured to build an access control list based on the address segment assigned to the first instance, where the access control list is used for controlling access between different first instances defined by the user; and a first sending module 403 configured to send the access control list to a switch control service, such that the switch control service configures the access control list for the switch.

In one embodiment, the data access apparatus can be used to implement the corresponding data access methods in the foregoing method embodiments, and has the same beneficial effects as the corresponding method embodiments, which are not repeated herein.

Figure 5:
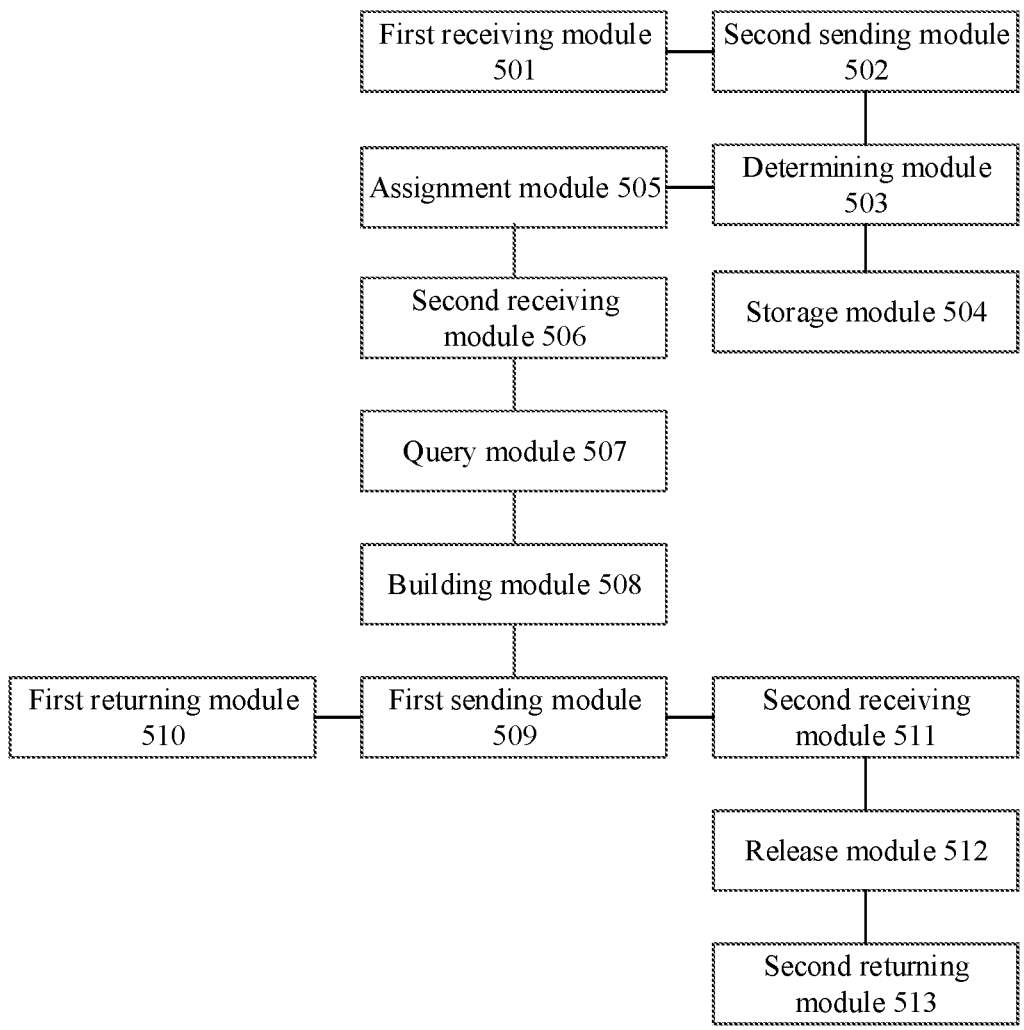
FIG. 5 is a schematic structural diagram of a data processing apparatus in accordance with one embodiment.

FIG. 5 is a schematic structural diagram of a data access apparatus in accordance with one embodiment.

In one embodiment, the data access apparatus can include: an assignment module 505 configured to assign, based on user information and a corresponding connection relationship between a switch and a first instance defined by a user, an address segment to the first instance; a building module 508 configured to build an access control list based on the address segment assigned to the first instance, where the access control list is used for controlling access between different first instances defined by the user; and a first sending module 509 configured to send the access control list to a switch control service, such that the switch control service configures the access control list for the switch.

Optionally, before the assignment module 505, the apparatus further includes: a first receiving module 501 configured to receive a multicast packet carrying information about a network port of a second instance that is sent by the second instance through the network port; a second sending module 502 configured to send a query request to a machine deployment control service based on the information about the network port that is carried in the multicast packet, to quay for deployment information of the second instance; and a determining module 503 configured to receive the deployment information returned by the machine deployment control service based on the quay request, and determine a corresponding connection relationship between the second instance and the switch based on the deployment information.

Optionally, the apparatus further includes: a storage module 504 configured to store the corresponding connection relationship between the second instance and the switch into a relationship table.

Optionally, the apparatus further includes: a second receiving module 506 configured to receive an address assignment request sent by an instance control service based on the first instance; and a quay module 507 configured to quay for a corresponding connection relationship between the first instance and the switch based on the address assignment request.

Optionally, the assignment module 505 is specifically configured to invoke, based on the user information carried in the address assignment request and the corresponding connection relationship between the first instance and the switch that is acquired through query, an address assignment service to assign the address segment to the first instance.

Optionally, the quay module 507 is specifically configured to: quay, based on identification information of the first instance carried in the address assignment request, the relationship table storing the corresponding connection relationship between the second instance and the switch, to acquire the corresponding connection relationship between the first instance and the switch.

Optionally, the building module 508 is specifically configured to: build the access control list based on the address segment assigned to the first instance and identification information of a cluster to which the first instance belongs that is carried in the address assignment request, where the access control list is used for controlling access between different first instances belonging to a same cluster.

Optionally, after the first sending module 509, the apparatus further includes: a first returning module 510 configured to return, to the instance control service, the address segment assigned by the address assignment service for the first instance, such that the instance control service starts the first instance to acquire from an image service an image file matching a specification of the first instance, and configures, based on the image file, the address segment assigned by the address assignment service for the first instance.

Optionally, the apparatus further includes: a second receiving module 511 configured to receive a second instance release request sent by the instance control service based on a first instance release request sent by a user; a release module 512 configured to reclaim, based on the second instance release request, an address of a to-be-released instance corresponding to instance identification information carried in the second instance release request, and configure, through the switch control service, the switch connected to the to-be-released instance such that a network port of the switch connected to the to-be-released instance is disconnected from other network ports; and a second returning module 513 configured to return, to the instance control service, a release result of the to-be-released instance requested by the second instance release request, such that the instance control service returns the to-be-released instance to an inventory and returns a release success message to the user.

In one embodiment, the data access apparatus can be used to implement the corresponding data access methods in the foregoing method embodiments, and has the same beneficial effects as the corresponding method embodiments, which are not repeated herein.

Figure 6:
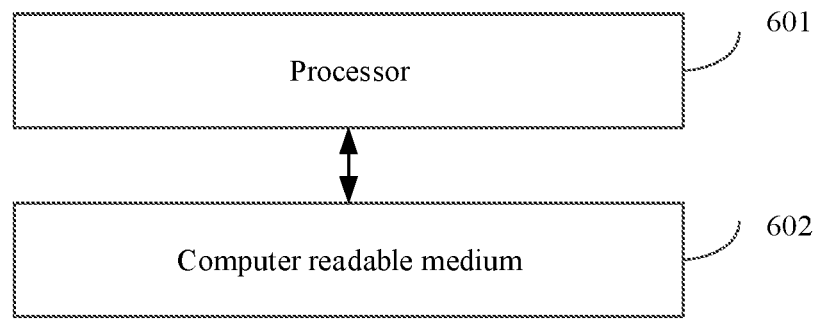
FIG. 6 is a schematic structural diagram of an electronic device in accordance with one embodiment.

FIG. 6 is a schematic structural diagram of an electronic device in accordance with one embodiment. The electronic device may include:

one or more processors 601; and a computer readable medium 602, which may be configured to store one or more programs; where when the one or more programs are executed by the one or more processors, the one or more processors are caused to implement a data access method. The method can be similar to the methods described herein (e.g., method similar to FIG. 1A, FIG. 2A, etc.).

Figure 7:
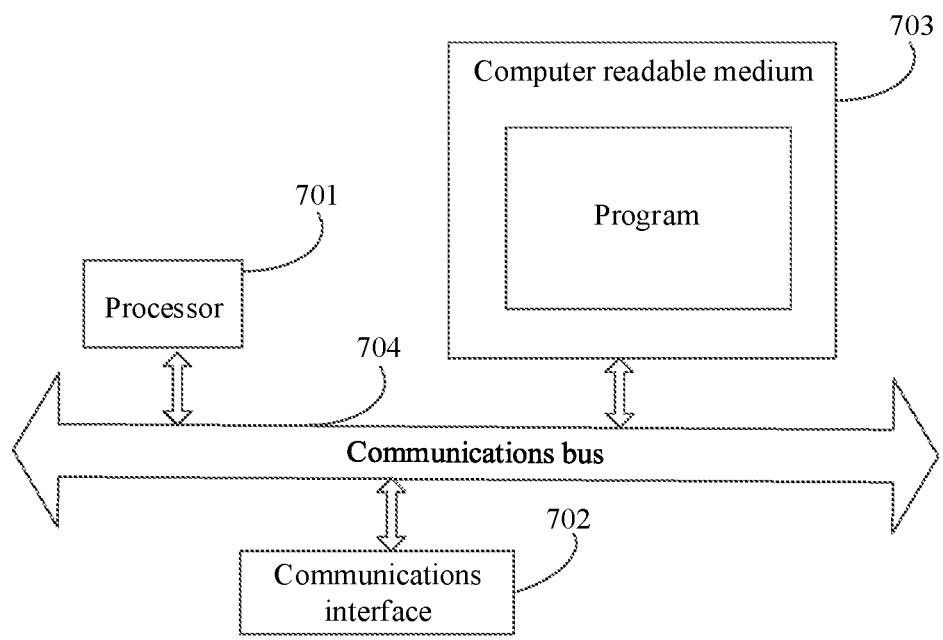
FIG. 7 shows a hardware structure of an electronic device in accordance with one embodiment.

FIG. 7 shows a hardware structure of an electronic device in accordance with one embodiment. As shown in FIG. 7, the hardware structure of the electronic device may include: a processor 701, a communications interface 702, a computer readable medium 703, and a communications bus 704.

The processor 701, the communications interface 702, and the computer readable medium 703 communicate with each other through the communications bus 704.

Optionally, the communications interface 702 may be an interface of a communications module, for example, an interface of a GSM module.

The processor 701 may be configured such that an RDMA control service assigns, based on user information and a corresponding connection relationship between a switch and a first instance defined by a user, an address segment to the first instance; the RDMA control service builds an access control list based on the address segment assigned to the first instance, where the access control list is used for controlling access between different first instances defined by the user; the RDMA control service sends the access control list to a switch control service, such that the switch control service configures the access control list for the switch.

The processor 701 may be a general-purpose processor, including a central processing unit (Central Processing Unit, CPU for short), a network processor (Network Processor, NP for short), or may be a digital signal processor (DSP), an application-specific integrated circuit (ASIC), a field programmable gate arrays (FPGA) or other programmable logic devices, a discrete gate or transistor logic device, or a discrete hardware component, which can implement or execute the methods, steps, and logical block diagrams that are disclosed herein. The general-purpose processor may be a microprocessor or any conventional processor.

The computer readable medium 703 may be, but is not limited to, a random access memory (Random Access Memory, RAM), a read only memory (Read Only Memory, ROM), a programmable read-only memory (Programmable Read-Only Memory, PROM), an erasable programmable read-only memory (Erasable Programmable Read-Only Memory, EPROM), an electric erasable programmable read-only memory (Electric Erasable Programmable Read-Only Memory, EEPROM), and the like.

In one embodiment, the procedures described above with reference to the flowcharts can be implemented as a computer software program. For example, an embodiment can include a computer program product, which includes a computer program carried on a computer readable medium, and the computer program includes program code used for executing the method shown in the flowchart. In such an embodiment, the computer program may be downloaded and installed from a network through the communications part, and/or installed from a removable medium. When the computer program is executed by a processor, the foregoing functions defined in the methods herein can be implemented. It should be noted that the computer readable medium described in this application may be a computer-readable signal medium or a computer readable storage medium, or any combination thereof. The computer readable medium may be, for example, but is not limited to, an electrical, magnetic, optical, electromagnetic, infrared, or semiconductor system, apparatus, or device, or any combination thereof. More specific examples of the computer readable medium may include, but are not limited to: an electrical connection having one or more wire conductors, a portable computer diskette, a hard disk drive, a random access memory (RAM), a read only memory (ROM), an erasable programmable read-only memory (EPROM or flash memory), an optical fiber, a portable compact disc read-only memory (CD-ROM), an optical storage medium, a magnetic storage medium, or any suitable combination thereof. In this application, the computer readable medium may be any tangible medium that contains or stores a program for use by or in combination with an instruction execution system, apparatus, or device. However, in this application, the computer-readable signal medium may include a data signal that is propagated in baseband or as part of a carrier wave, in which computer-readable program code is carried. Such a propagated signal may be in a variety of forms, including but not limited to, an electromagnetic signal, an optical signal, or any suitable combination thereof. The computer-readable signal medium may also be any computer readable medium other than the computer readable storage medium, and that computer readable medium can send, propagate, or transport a program configured for use by or in combination with an instruction execution system, apparatus, or device. Program code contained in the computer readable medium may be transmitted using any appropriate medium, including but not limited to a wireless connection, an electrical cable, an optical cable, RF, or any suitable combination thereof.

The computer program code configured for performing operations in this application may be compiled by using one or more programming languages or a combination thereof. The programming languages include object-oriented programming languages such as Java, Smalltalk, C++, and also include conventional procedural programming languages such as "C" language or similar programming languages. The program code may be executed entirely on a user's computer, partly on a user's computer, as a stand-alone software package, partly on a user's computer and partly on a remote computer, or entirely on a remote computer or server. In situations involving a remote computer, the remote computer may be connected to a computer of the user through any kind of network, including a local area network (LAN) or a wide area network (WAN), or may be connected to an external computer (for example, through the Internet with the help of an Internet service provider).

The flowcharts and block diagrams in the drawings can include illustrations exemplary implementations of system architectures, functions, operations of the system, methods, and computer program products according to the embodiments of this application. In one embodiment, each block in the flowcharts or the block diagrams may represent a module, a program segment, or part of code, and the module, the program segment or the part of code includes one or more executable instructions configured to realize a specified logical function. Specific sequential relations are present in the foregoing embodiments, but these sequential relations are merely examples. In specific implementations, fewer or more steps may be executed, or the execution order of these steps may be adjusted. In other words, in some alternative implementations, the functions marked in the blocks may be implemented in a different sequence than marked in the accompanying drawings. For example, two blocks in succession may actually be executed substantially concurrently or executed in a reverse sequence sometimes, depending on the involved functions. It should be further noted that each block in the block diagrams and/or the flowcharts and a combination of the blocks in the block diagrams and/or the flowcharts may be implemented by a dedicated hardware-based system for executing a specified function or operation or may be implemented by a combination of dedicated hardware and computer instructions, or the like.

In one embodiment, the modules can be implemented in software or hardware. The described modules may alternatively be provided in the processor, which may be described as, for example, a processor including an assignment module, a building module, and a first sending module. The names of these modules do not constitute a limitation on the modules themselves in some circumstances. For example, the assignment module may alternatively be described as "a module configured to assign, based on user information and a corresponding connection relationship between a switch and a first instance defined by a user, an address segment to the first instance".

In one embodiment, a computer readable medium stores a computer program, and when the computer program is executed by a processor, a method similar to the methods described herein (e.g., method similar to FIG. 1A, FIG. 2A, etc.) can be implemented.

In addition, this application further provides a computer readable medium. The computer readable medium may be included in an apparatus (e.g., similar to the apparatus described in the foregoing embodiment, etc.); or may exist alone without being assembled into the apparatus. The computer readable medium can carry one or more programs, and when the one or more programs are executed by the apparatus, the apparatus is caused to have an RDMA control service assign an address segment to a first instance defined by a user based on user information and a corresponding connection relationship between the first instance and a switch; have the RDMA control service build an access control list based on the address segment assigned to the first instance, where the access control list is used for controlling access between different first instances defined by the user; and have the RDMA control service send the access control list to a switch control service, such that the switch control service configures the access control list for the switch.

The expressions "first", "second", "the first", or "the second" used in various embodiments of this disclosure can modify various components regardless of order and/or importance, but these expressions do not limit the corresponding components. The foregoing expressions are configured for the purpose of distinguishing elements from other elements. For example, first user equipment and second user equipment represent different user equipment, although the two are both user equipment. For example, without departing from the scope of this disclosure, a first element may be referred to as a second element, and similarly, a second element may be referred to as a first element.

When an element (for example, a first element) is referred to as being "(operably or communicatively) linked to" or "(operably or communicatively) coupled to" another element (for example, a second element), or "connected to" another element (for example, a second element), it should be understood that the element is directly connected to the another element or the element is indirectly connected to the another element through another element (for example, a third element). On the contrary, it can be understood that when an element (for example, a first element) is referred to as being "directly connected" or "directly coupled" to another element (a second element), no element (for example, a third element) is inserted between the two elements.

The above description includes a preferred embodiment and explanation of the applied technical principles. Those skilled in the art should understand that the scope of invention involved in this application is not limited to the technical solutions defined by the specific combinations of the above technical features, but should also cover other technical solutions defined by any combinations of the above technical features or their equivalent features without departing from the above inventive concept, for example, technical solutions defined by replacement between the above features and technical features having similar functions disclosed in this application (without limitation).

What is claimed is:

1. A data access method, wherein the method comprises:
    receiving, by a Remote Direct Memory Address (RDMA) control service, an address assignment request sent by an instance control service based on a first instance;
    assigning, by a Remote Direct Memory Address (RDMA) control service, an address segment to the first instance based on user information and a corresponding connection relationship between a switch and the first instance defined by a user;
    building, by the RDMA control service, an access control list based on the address segment assigned to the first instance, wherein the access control list is used for controlling access between different first instances defined by the user;
    sending, by the RDMA control service, the access control list to a switch control service, such that the switch control service configures the access control list for the switch;
    returning, by the RDMA control service, the address segment to the instance control service, such that the instance control service starts the first instance;
    receiving, by the RDMA control service, a multicast packet carrying information about a network port of a second instance that is sent by the second instance through the network port, wherein the receiving is before the assigning of an address segment to the first instance;
    sending, by the RDMA control service, a query request to a machine deployment control service based on the information about the network port that is carried in the multicast packet, to query for deployment information of the second instance; and
    receiving, by the RDMA control service, the deployment information returned by the machine deployment control service based on the query request, and determining a corresponding connection relationship between the second instance and the switch based on the deployment information.

2. The method according to claim 1, wherein the method further comprises:
    storing, by the RDMA control service, the corresponding connection relationship between the second instance and the switch into a relationship table.

3. The method according to claim 2, wherein the method further comprises:
    querying, by the RDMA control service, for a corresponding connection relationship between the first instance and the switch based on the address assignment request.

4. The method according to claim 3, wherein the assigning, by an RDMA control service based on user information and a corresponding connection relationship between a switch and a first instance defined by a user, an address segment to the first instance comprises:
    invoking, by the RDMA control service based on the user information carried in the address assignment request and the corresponding connection relationship between the first instance and the switch that is acquired through query, an address assignment service to assign the address segment to the first instance.

5. The method according to claim 3, wherein the querying, by the RDMA control service, for a corresponding connection relationship between the first instance and the switch based on the address assignment request comprises:
    querying, by the RDMA control service based on identification information of the first instance carried in the address assignment request, the relationship table storing the corresponding connection relationship between the second instance and the switch, to acquire the corresponding connection relationship between the first instance and the switch.

6. The method according to claim 3, wherein the building, by the RDMA control service, an access control list based on the address segment assigned to the first instance comprises:
    building, by the RDMA control service, the access control list based on the address segment assigned to the first instance and identification information of a cluster to which the first instance belongs that is carried in the address assignment request, wherein the access control list is used for controlling access between different first instances belonging to a same cluster.

7. The method according to claim 3, wherein the address segment is returned to the instance control service after the sending, by the RDMA control service, the access control list to a switch control service,
    such that the instance control service starts the first instance to acquire from an image service an image file matching a specification of the first instance, and configures, based on the image file, the address segment assigned by the address assignment service for the first instance.

8. The method according to claim 1, wherein the method further comprises:
    receiving, by the RDMA control service, a second instance release request sent by an instance control service based on a first instance release request sent by a user;
    reclaiming, by the RDMA control service based on the second instance release request, an address of a to-be-released instance corresponding to instance identification information carried in the second instance release request, and configuring, through the switch control service, the switch connected to the to-be-released instance such that a network port of the switch connected to the to-be-released instance is disconnected from other network ports; and returning, by the RDMA control service to the instance control service, a release result of the to-be-released instance requested by the second instance release request, such that the instance control service returns the to-be-released instance to an inventory and returns a release success message to the user.

9. A data access apparatus, wherein the apparatus comprises:
a first receiving module configured to receive an address assignment request sent by an instance control service based on a first instance;
an assignment module configured to assign an address segment to the first instance, based on user information and a corresponding connection relationship between a switch and the first instance defined by a user;
a building module configured to build an access control list based on the address segment assigned to the first instance, wherein the access control list is used for controlling access between different first instances defined by the user;
a first sending module configured to send the access control list to a switch control service, such that the switch control service configures the access control list for the switch;
a first returning module configured to return, to the instance control service, the address segment assigned by the assignment module for the first instance, such that the instance control service starts the first instance;
a second receiving module configured to receive a multicast packet carrying information about a network port of a second instance that is sent by the second instance through the network port;
a second sending module configured to send a query request to a machine deployment control service based on the information about the network port that is carried in the multicast packet, to query for deployment information of the second instance; and
a determining module configured to receive the deployment information returned by the machine deployment control service based on the query request, and determine a corresponding connection relationship between the second instance and the switch based on the deployment information.

10. The apparatus according to claim 9, wherein the apparatus further comprises:
a storage module configured to store the corresponding connection relationship between the second instance and the switch into a relationship table.

11. The apparatus according to claim 10, wherein the apparatus further comprises:
a second receiving module configured to receive an address assignment request sent by an instance control service based on the first instance; and
a query module configured to query for a corresponding connection relationship between the first instance and the switch based on the address assignment request.

12. The apparatus according to claim 11, wherein the assignment module is specifically configured to:
invoke, based on the user information carried in the address assignment request and the corresponding connection relationship between the first instance and the switch that is acquired through query, an address assignment service to assign the address segment to the first instance.

13. The apparatus according to claim 11, wherein the query module is specifically configured to:
query, based on identification information of the first instance carried in the address assignment request, the relationship table storing the corresponding connection relationship between the second instance and the switch, to acquire the corresponding connection relationship between the first instance and the switch.

14. The apparatus according to claim 11, wherein the building module is specifically configured to:
build the access control list based on the address segment assigned to the first instance and identification information of a cluster to which the first instance belongs that is carried in the address assignment request, wherein the access control list is used for controlling access between different first instances belonging to a same cluster.

15. The apparatus according to claim 11, wherein after the first sending module sends the address segment for the first instance the first returning module returning module returns the address segment to the instance control service
such that the instance control service starts the first instance to acquire from an image service an image file matching a specification of the first instance, and configures, based on the image file, the address segment assigned by the address assignment service for the first instance.

16. The apparatus according to claim 9, wherein the apparatus further comprises:
a second receiving module configured to receive a second instance release request sent by the instance control service based on a first instance release request sent by a user;
a release module configured to reclaim, based on the second instance release request, an address of a to-be-released instance corresponding to instance identification information carried in the second instance release request, and configure, through the switch control service, the switch connected to the to-be-released instance such that a network port of the switch connected to the to-be-released instance is disconnected from other network ports; and
a second returning module configured to return, to the instance control service, a release result of the to-be-released instance requested by the second instance release request, such that the instance control service returns the to-be-released instance to an inventory and returns a release success message to the user.

17. A data access system, wherein the system comprises:
an RDMA control service that:
receives an address assignment request sent by an instance control service, wherein the address assignment request is for based on a first instance with a RoCE-based RDMA communication function, wherein identification information from the instance control service is utilized to select a specification from a corresponding elastic compute specification family, and an Application Program Interface (API) is invoked to create the first instance according to a specification selected from the elastic compute specification family,
assigns an address segment to the first instance, based on user information and a corresponding connection relationship between a switch and a first instance defined by a user, wherein the RDMA control service queries a corresponding connection relationship between the network port of the instance and the switch based on the identification information of the instance carried in the request, and invokes a Dynamic Host Configuration Protocol (DHCP) service to assign an address to the network port of the first instance, builds an access control list based on the address segment assigned to the first instance, wherein the access control list is used for controlling access between different first instances defined by the user, sends the access control list to a switch control service, and returns the address segment to the instance control service to start the first instance, wherein the instance control service acquires from an image service an image file matching the specification of the first instance and the instance control service configures, based on the image file, the address segment so that the instance control service can start the address segment configured and assigned for the first instance; and a switch control service that configures the access control list for the switch based on the received access control list.

18. The system according to claim 17, wherein the first instance comprises an adapter, and the adapter integrates a network port, wherein the network port is an enhanced Ethernet—based RDMA network port.

* * * * *